(12) United States Patent
Penn et al.

(10) Patent No.: US 7,216,990 B2
(45) Date of Patent: May 15, 2007

(54) INTEGRATED LAMP AND APERTURE ALIGNMENT METHOD AND SYSTEM

(75) Inventors: Steven M. Penn, Plano, TX (US); Steven E. Smith, Coppell, TX (US)

(73) Assignee: Texas Instruments Incorporated, Dallas, TX (US)

( * ) Notice: Subject to any disclaimer, the term of this patent is extended or adjusted under 35 U.S.C. 154(b) by 2 days.

(21) Appl. No.: 10/739,357

(22) Filed: Dec. 18, 2003

(65) Prior Publication Data
US 2005/0134809 A1  Jun. 23, 2005

(51) Int. Cl.
G03B 21/20 (2006.01)
F21V 19/02 (2006.01)

(52) U.S. Cl. ......................... 353/87; 362/285
(58) Field of Classification Search .............. 353/85, 353/87, 98, 99, 121; 362/257, 277, 285
See application file for complete search history.

(56) References Cited

U.S. PATENT DOCUMENTS

| | | | |
|---|---|---|---|
| 5,760,976 A | 6/1998 | DeLaMatyr et al. | 359/820 |
| 5,855,430 A * | 1/1999 | Coushaine et al. | 362/519 |
| 5,982,957 A * | 11/1999 | DeCaro et al. | 382/312 |
| 6,231,190 B1 | 5/2001 | Dewald | 353/31 |
| 6,315,415 B1 * | 11/2001 | Hayashi et al. | 353/98 |
| 6,351,070 B1 | 2/2002 | Barry | 315/39 |
| 6,476,986 B2 | 11/2002 | Smith et al. | 359/827 |
| 6,575,606 B2 * | 6/2003 | Shaw | 362/433 |
| 6,587,159 B1 | 7/2003 | Dewald | 348/744 |
| 6,591,022 B2 | 7/2003 | Dewald | 382/274 |
| 6,883,937 B2 * | 4/2005 | Vastola et al. | 362/293 |
| 6,927,910 B2 * | 8/2005 | Kang | 385/901 |
| 2003/0099108 A1 * | 5/2003 | Slobodin | 362/293 |
| 2004/0165386 A1 * | 8/2004 | Lee et al. | 362/285 |
| 2004/0246452 A1 * | 12/2004 | Fujisawa et al. | 353/99 |
| 2005/0276050 A1 * | 12/2005 | Pate | 362/261 |

* cited by examiner

*Primary Examiner*—Christopher Mahoney
(74) *Attorney, Agent, or Firm*—Charles A. Brill; Wade James Brady, III; Frederick J. Telecky, Jr.

(57) ABSTRACT

According to one embodiment a method for aligning a light source includes providing a lamp and a lamp interface. The lamp interface has an alignment aperture disposed thereon. The method also includes aligning the lamp with respect to the lamp interface until a desired amount of light is focused on the alignment aperture. The method further includes fixing the lamp to the lamp aperture to form an aligned lamp assembly after obtaining a desired lamp alignment. Then the aligned lamp assembly is coupled to an integrating rod.

18 Claims, 3 Drawing Sheets

INTEGRATED LAMP AND APERTURE ALIGNMENT METHOD AND SYSTEM

TECHNICAL FIELD OF THE INVENTION

This invention relates generally to display systems and more particularly to integrated lamp and aperture alignment method and system.

BACKGROUND OF THE INVENTION

Many display systems use spatial light modulators that receive a beam of light from a light integrating rod. The light integrating rod takes a non-uniform beam of light and converts it into uniformly distributed light. Such integrating rods are often used in deformable micro-mirror devices (DMD). As DMDs become smaller and smaller, the size of integrating rods also reduces. Although the light received by the integrating rod is not uniform, it is important that the light received by the integrated rod is focused to an input aperture of the integrating rod. If the input light is not focused, light is lost in the display system, resulting in less than optimal display quality. As the size of integrating rods shrinks, it becomes more and more critical to have proper focus of the beam received by the integrator rod. Further, many display systems utilize a sequential color recapture (SCR) aperture, which requires even greater precision in the focus of light achieved by the SCR aperture.

Although it is critically important to focus the light received by the integrating rod aperture, current methods can be both time consuming and less than effective. For example, current methods generally involve mounting the integrating rods aperture on the rod, which is then fixed to remaining portions of the projector system. Then the lamp is brought in and selectively adjusted until a desirable amount of light is received by the integrating rod aperture. This approach suffers several disadvantages. First, it is time consuming, requiring a skilled technician to accurately align the lamp to the integrating rod aperture. Further, the aperture may be damaged as light rays impinge upon it during this alignment process. An alternative method relies on tight tolerances between constituent portions of the projector system, assuming alignment will occur naturally. However, this alignment method often results in less than optimal retransmission through the integrating rod.

SUMMARY OF THE INVENTION

According to one embodiment a method for aligning a light source includes providing a lamp and a lamp interface. The lamp interface has an alignment aperture disposed thereon. The method also includes aligning the lamp with respect to the lamp interface until a desired amount of light is focused on the alignment aperture. The method further includes fixing the lamp to the lamp aperture to form an aligned lamp assembly after obtaining a desired lamp alignment. Then the aligned lamp assembly is coupled to an integrating rod.

Some embodiments of the invention provide numerous technical advantages. Some embodiments may benefit from some, none, or all of these advantages. For example, according to one embodiment of the invention, a method and system for aligning a lamp to an alignment aperture is provided that results in a less costly and more accurate procedure for alignment. According to one embodiment, such advantages may be obtained by forming an integrated device that includes the lamp and the alignment aperture, rather than aligning the lamp to an integrating rod. The lamp and lamp aperture may be aligned through selective positioning of the lamp with respect to the alignment aperture. A lamp interface may be utilized to provide a mechanical structure for supporting the alignment aperture and this mechanical structure may be positioned with respect to the lamp until the desired alignment is obtained.

Other advantages are readily apparent to those of skill in the art.

BRIEF DESCRIPTION OF THE DRAWINGS

For a more complete understanding of embodiments of the invention, reference is now made to the following description, taken in conjunction with the accompanying drawings, in which.

DETAILED DESCRIPTION OF THE INVENTION

Embodiments of the invention and its advantages are best understood by referring to FIGS. 1 through 4 of the drawings, like numerals being used for like and corresponding parts of the various drawings.

Figure 1:
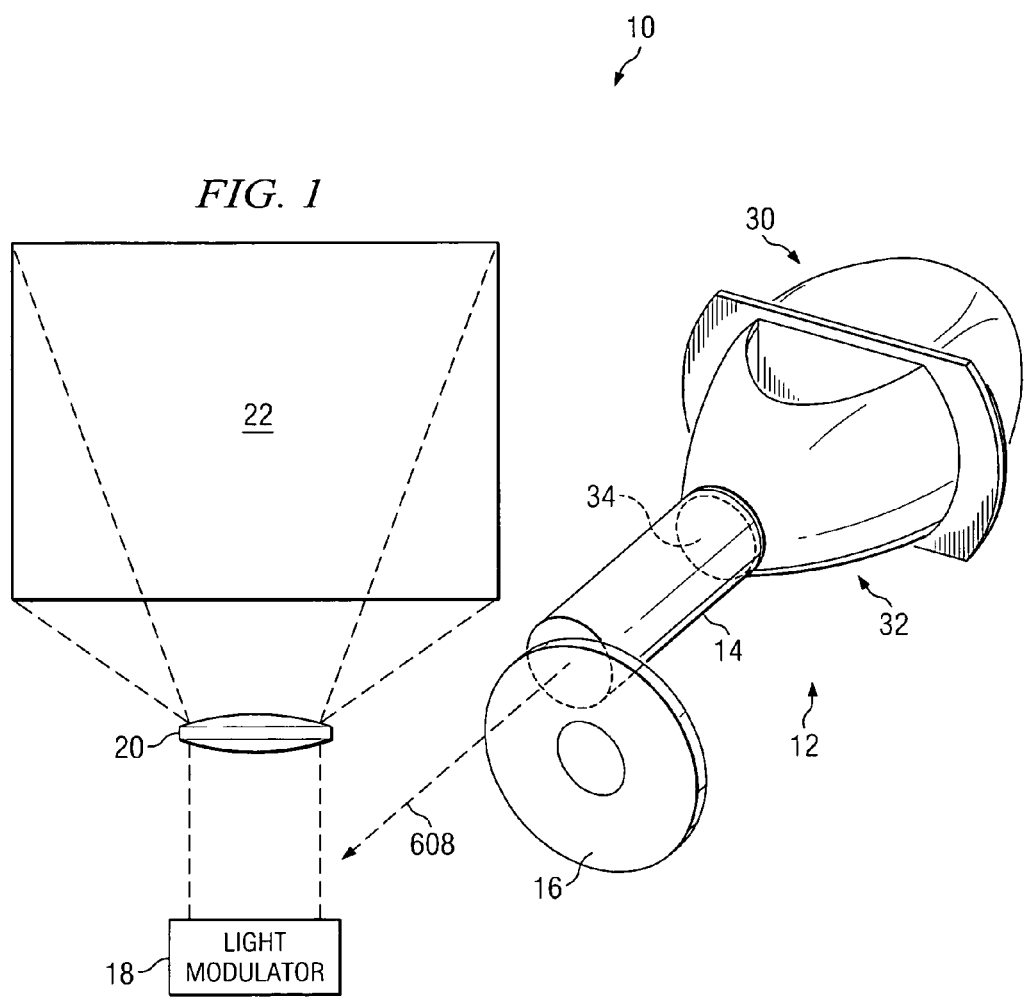
FIG. 1 is schematic diagram illustrating a display system that may benefit from the teachings of the invention.

FIG. 1 is a schematic diagram illustrating a system that may benefit from the teachings of the invention. Display system 10 includes a lamp interface assembly 12 that provides focused but generally non-uniform light to an integrating rod 14. Integrating rod 14 outputs uniform light through, in this example, a color wheel 16. In this example, color wheel 16 includes a plurality of colored filters generating light of a particular color, which is provided to spatial light modulator 18. Spatial light modulator 18 selectively modulates light received and projects it through a lens 20 for display on a lens 22. By appropriately modulating received light, an image may be displayed on display 22 that may be perceived by a viewer to be made up of a plurality of different colors.

As described above, it is important that light received by integrating rod 14 is appropriately focused such that an optimal amount of light may be transmitted through integrating rod 14, resulting in the brightest possible image on display 22. The teachings of the invention recognize that an inherent disadvantage of current methods of alignment is that the alignment aperture (illustrated in FIG. 2) has traditionally been mounted on integrating rod 14 with the alignment procedure requiring alignment between the associated lamp and integrating rod 14. This is difficult because generally, integrating rod 14 is coupled to other portions of the display system 10, allowing movement of only the lamp for alignment purposes. Further alignment at this stage of manufacture is difficult and, as described above, can result in harm to the alignment aperture.

According to the teachings of the invention, rather than aligning a lamp to an aperture disposed on a device, a lamp assembly 12 is provided that is already aligned to an alignment aperture at the time the lamp assembly is coupled to integrating rod 14. Generally, alignment of the entire lamp assembly with respect to the integrating rod is not as important as the alignment of the lamp with respect to the alignment aperture. Thus, precision alignment can be performed outside the context of the entire display system, with the coupling of the lamp assembly to the integrating rod not requiring precision alignment. This may be accomplished, in one embodiment, by attaching an alignment aperture to a lamp interface, and then aligning the lamp interface to the lamp. In this manner, a lamp assembly may be provided that is already aligned with respect to the alignment aperture and can be easily coupled to the integrating rod. Details of example embodiments are described with respect to FIGS. 2 through 4.

Figure 2:
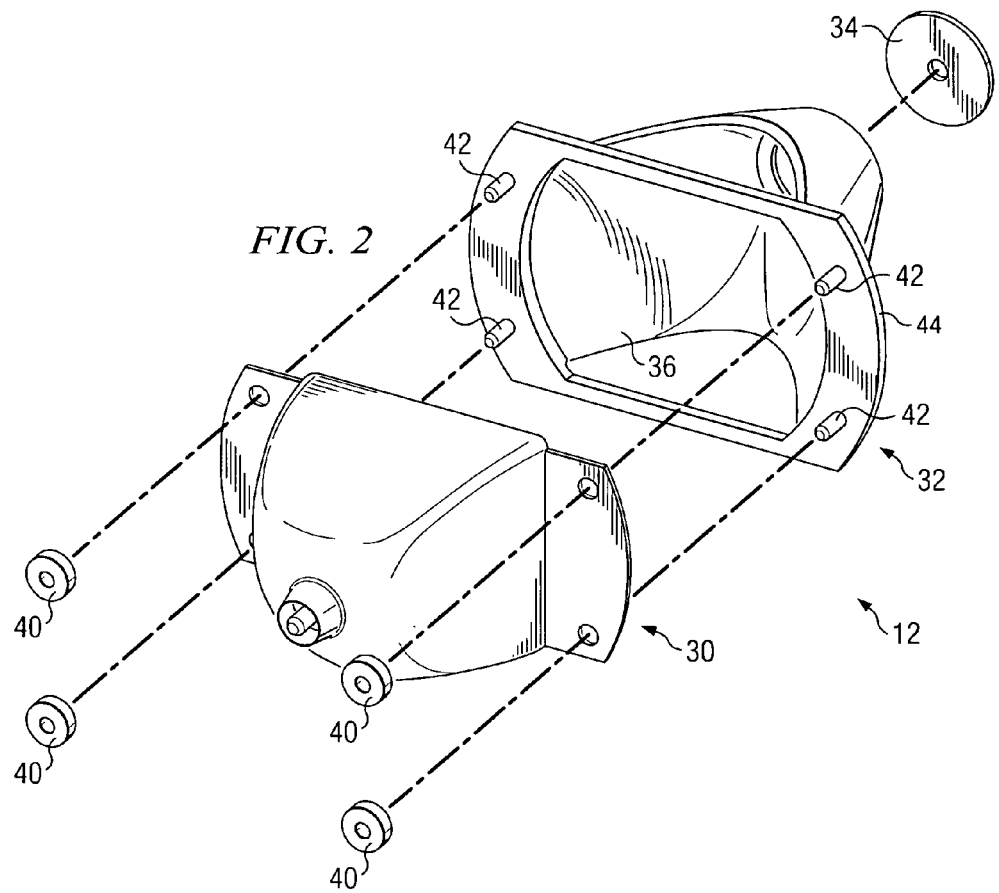
FIG. 2 is a schematic diagram with portions broken away showing a lamp interface assembly according to the teachings of the invention.

FIG. 2 is a schematic diagram with portions broken away of lamp assembly 12 according to the teachings of the invention. Lamp assembly 12 includes a lamp 30, a lamp interface 32, and an alignment aperture 34. Lamp 30 may be any suitable lamp and the suitability of the lamp depends upon its desired operation; however, in one embodiment, lamp 30 is a Phillips ultra-high pressure mercury vapor arc lamp, which is elliptical. However, parabolic lamps, in combination with a lens to focus the light, and other types of lamps may be used. Lamp interface 32 operates generally to provide a mechanical connection between lamp 30 and alignment aperture 34, and to provide a mechanism for supporting alignment aperture 34 at a desired focus location. In one embodiment, lamp interface 32 includes a generally reflective interior surface 36, which allows recycling of light lost from lamp 30 for later use. Alignment aperture 34 is a conventional aperture, which heretofore has been used on integrating rod 14. Alignment aperture 34 may be a sequential color recapture aperture or other type. Alignment aperture 34 may be permanently fixed to lamp interface 32, such as through an adhesive, soldering, welding, or other technique. Alternatively alignment aperture 34 may be removably attached to lamp interface 32.

In one embodiment, a plurality of six-axis joints 38 (shown best in FIG. 3B) are provided to attach lamp 30 to lamp interface 32. As described in greater detail below in conjunction with FIG. 3B, six-axis joints 38 include washers 40, pins 42, and plate 44. Plate 44 in this example forms a portion of lamp interface 32. The use of six-axis joints 38 provides one way of providing six-axes adjustment between lamp 30 and lamp interface 32. Due to stringent focusing requirements for integrating rod 14, the ability to adjust focus of lamp 30 with respect to lamp interface 32, and therefore alignment aperture 34, allows for this greater required alignment precision. Six-axis joints suitable for use in the present invention include those described in U.S. Pat. No. 6,476,986, entitled "Six-Axis Attachment Apparatus and Method for Spatial Light Modulators", assigned to Texas Instruments, which is incorporated herein by reference. Lamp assembly 12 is shown assembled in FIG. 3A.

Figure 3A:
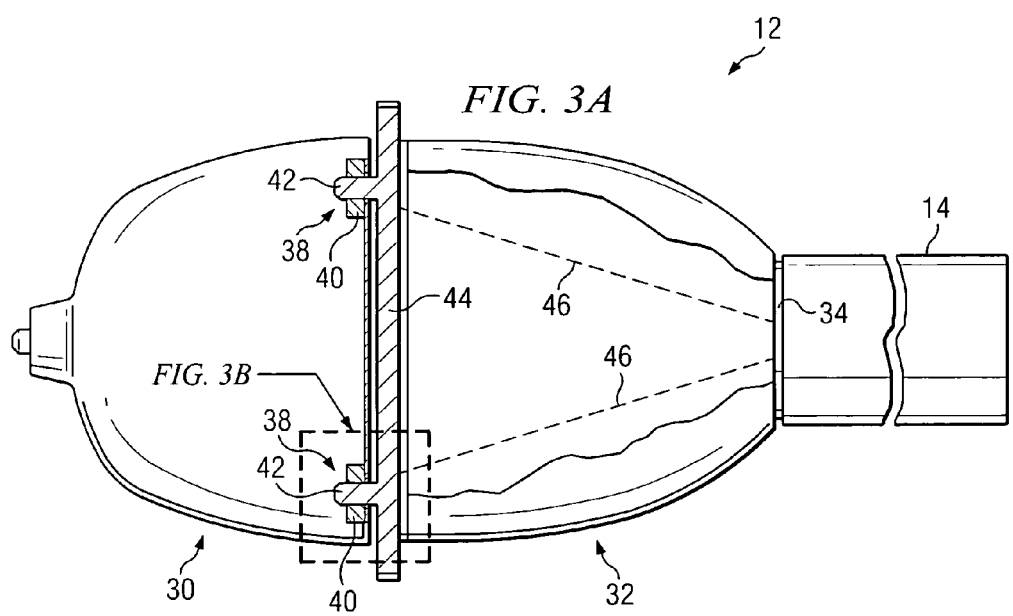
FIG. 3A is an elevational view of an assembled lamp interface assembly of FIG. 2.

FIG. 3A is an elevational view of lamp assembly 12. As illustrated, lamp 30 is coupled to lamp interface 32, allowing light to focus on alignment aperture 34, as indicated by reference numerals 46. Also illustrated in FIG. 3A is integrating rod 14. Integrating rod 14 may be coupled to lamp assembly 12 in a variety of manners and in this example is coupled through mating internal and external threads (not explicitly shown). As described above, alignment of integrating rod 14 with respect to alignment aperture 34 is not as critical as the alignment of lamp 30 with respect to alignment aperture 34. Thus a relatively simple coupling procedure may be utilized to attach lamp assembly 12 to integrating rod 14. Other attachment mechanisms may be utilized, including pins.

Figure 3B:
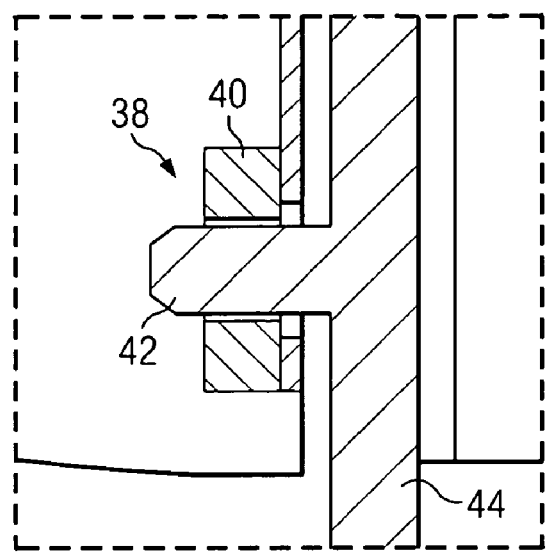
FIG. 3B is an exploded view of portions of the assembled lamp interface assembly of 3A, showing additional details of a six-axis joint.

FIG. 3B is an exploded diagram showing additional details of six-axis joint 38. As illustrated, six-axis joint 38 includes a washer 40, pins 42, and plate 44. These joints 38 allow alignment in six axes (x, y, z and the three rotational axes), which allows precision alignment of lamp 30 with respect to alignment aperture 34. Although six-axis joints 38 are illustrated as one example, other suitable approaches for coupling lamp 30 to lamp interface 32 may be utilized including those that result in six degrees of freedom for alignment and those that result in lesser degrees of freedom for alignment.

Figure 4:
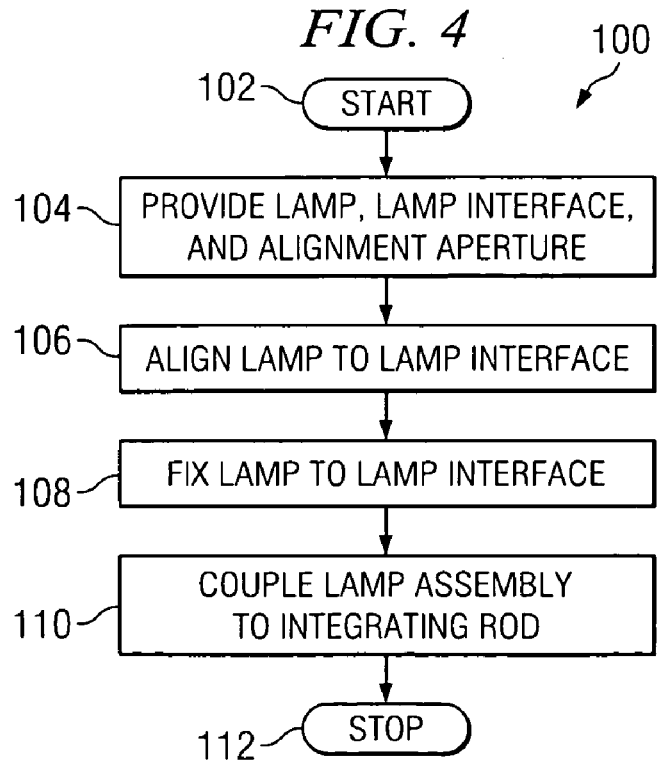
FIG. 4 is a flowchart showing a method for aligning a light source to an integrating rod in a display system according to one embodiment of the invention.

FIG. 4 is a flowchart illustrating a method for aligning a light source to an integrating rod and a display system according to the teachings of the invention. With reference to FIGS. 1 through 3B, as well as FIG. 4, the method is described. Method 100 begins at step 102. At step 104 a lamp, such as lamp 30, and a separate lamp interface, such as lamp interface 32 having an alignment aperture, such as alignment aperture 34, is provided. At step 106, lamp 30 is aligned with respect to lamp interface 32 until a desired amount of light is focused on alignment aperture 34. Such alignment may occur through use of six axis joints, such as six-axis joints 38. By aligning in six axes, a greater amount of light from the lamp may be transmitted to integrated rod 14. However, alignment in a fewer number of axes may also be utilized. This alignment act may involve measuring the amount of light received at alignment aperture 34 or other suitable techniques. At step 108, after the lamp is aligned to the lamp interface, the lamp is affixed to the lamp interface such that the alignment may be maintained. One method for doing this is by locking down the adjustment hardware through the use of epoxy bonds; however, other suitable techniques may be utilized. At step 110, after the lamp has been aligned with respect to the alignment aperture, the aligned lamp assembly may be coupled to an integrating rod. This coupling may be performed in a variety of matters, such as through screwing the lamp assembly into the integrating rod; however, as described above, precise alignment of the lamp assembly to the integrating rod is not required. The method concludes at step 112.

Thus, a method and system are provided that facilitates precision alignment between an alignment aperture in the lamp. This procedure may be performed at an earlier stage of manufacture than conventional alignment procedures, resulting in lower cost and better precision in the alignment process.

Although embodiments of the invention have been described in detail, a person skilled in the art could make various alterations, additions, and omissions without departing from the spirit and scope of the present invention, as defined by the appended claims.

What is claimed is:

1. A method for aligning a light source to an integrating rod in a display system comprising:

providing a lamp and a lamp interface, the lamp interface having an alignment aperture disposed thereon;

aligning the lamp with respect to the lamp interface until a desired amount of light is focused on the alignment aperture;

after obtaining a desired lamp alignment, fixing the lamp to the lamp interface to form an aligned lamp assembly; and coupling the aligned lamp assembly to the integrating rod.

2. The method of claim 1, wherein the alignment aperture is a sequential color recapture aperture.

3. The method of claim 1, wherein the lamp interface is tapered and configured to attach to the integrating rod.

4. The method of claim 1, wherein an interior surface of the lamp interface is reflective and operable to recycle light lost from the lamp.

5. The method of claim 1, wherein aligning the lamp with respect to the lamp interface comprises aligning the lamp with respect to the lamp interface in six axes.

6. The method of claim 5, wherein aligning the lamp with respect to the lamp interface comprises aligning by adjusting a plurality of six-axis joints.

7. The method of claim 1, wherein the lamp is elliptical.

8. The method of claim 1, wherein the alignment aperture is permanently affixed to the lamp interface.

9. The method of claim 1, wherein aligning the lamp with respect to the lamp interface comprises measuring the amount of light transmitted through the alignment aperture.

10. The method of claim 1, wherein coupling the aligned lamp assembly to the integrating rod comprises screwing the lamp interface into the integrating rod.

11. A sub-assembly for use in a display system comprising:
a lamp;
a lamp interface coupled to the lamp by a plurality of six-axis joints;
an alignment aperture disposed on the lamp interface; and
wherein the lamp is aligned with the lamp interface such that a point of focus of light from the lamp is the alignment aperture.

12. The sub-assembly of claim 11, wherein the lamp is elliptical.

13. The sub-assembly of claim 11, wherein the lamp is parabolic and further comprising a lens for focusing light from the parabolic lamp.

14. The sub-assembly of claim 11, wherein the alignment aperture is a sequential color recapture aperture.

15. The sub-assembly of claim 11, wherein the lamp interface is tapered and configured to couple to an integrating rod.

16. The sub-assembly of claim 11, wherein the lamp aperture is not coupled to an integrating rod.

17. A method for aligning a light source comprising:
providing a lamp and a lamp interface, the lamp interface having an alignment aperture disposed thereon;
aligning the lamp with respect to the lamp interface until a desired amount of light is focused on the alignment aperture; and
after obtaining a desired lamp alignment, fixing the lamp to the alignment aperture to form an aligned lamp assembly;
wherein the lamp interface is configured to attach to an integrating rod.

18. A method for aligning a light source comprising:
providing a lamp and a lamp interface, the lamp interface having an alignment aperture disposed thereon;
aligning the lamp with respect to the lamp interface until a desired amount of light is focused on the alignment aperture; and
after obtaining a desired lamp alignment, fixing the lamp to the alignment aperture to form an aligned lamp assembly;
wherein aligning the lamp with respect to the lamp interface comprises aligning the lamp with respect to the lamp interface and six axes.

* * * * *